United States Patent
Fan Jiang et al.

(10) Patent No.: US 10,649,248 B1
(45) Date of Patent: May 12, 2020

(54) DISPLAYS WITH ADJUSTABLE PRIVACY LEVELS

(71) Applicant: Apple Inc., Cupertino, CA (US)

(72) Inventors: Shih-Chyuan Fan Jiang, San Jose, CA (US); Shih-Wei Chang, San Jose, CA (US); Yuan Chen, San Jose, CA (US); Zhibing Ge, Los Altos, CA (US); Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 15/839,195

(22) Filed: Dec. 12, 2017

Related U.S. Application Data (60) Provisional application No. 62/447,267, filed on Jan. 17, 2017.

(51) Int. Cl.
| | | |
|---|---|---|
| *G02F 1/13* | (2006.01) | |
| *G02F 1/13357* | (2006.01) | |
| *H04N 7/14* | (2006.01) | |
| *H04N 5/225* | (2006.01) | |
| *H04N 5/232* | (2006.01) | |

(52) U.S. Cl.
CPC ...... *G02F 1/1323* (2013.01); *G02F 1/133606* (2013.01); *H04N 5/2256* (2013.01); *H04N 5/23219* (2013.01); *H04N 7/141* (2013.01)

(58) Field of Classification Search
CPC .... G02F 1/1335; G02F 1/1333; G02F 1/1347; G02F 1/1323; G02F 1/133606; H04N 7/141; H04N 5/2256; H04N 5/23219
USPC .................................................... 349/62–65
See application file for complete search history.

(56) References Cited

U.S. PATENT DOCUMENTS

| | | | |
|---|---|---|---|
| 7,551,239 B2 | 6/2009 | Fukushima et al. | |
| 2007/0030240 A1 | 2/2007 | Sumiyoshi et al. | |
| 2007/0268427 A1* | 11/2007 | Uehara | G02B 6/0016 349/62 |
| 2009/0102990 A1* | 4/2009 | Walton | G02F 1/1323 349/15 |
| 2009/0178756 A1 | 7/2009 | Matsuoka | |
| 2010/0188617 A1* | 7/2010 | Sakai | G02B 27/281 349/75 |
| 2012/0113158 A1* | 5/2012 | Goto | G02B 6/0038 345/690 |
| 2017/0062674 A1* | 3/2017 | Kwon | H01L 33/58 |

(Continued)

*Primary Examiner* — Charles S Chang
(74) *Attorney, Agent, or Firm* — Treyz Law Group, P.C.; G. Victor Treyz; Joseph F. Guihan (57) ABSTRACT

A display may have display layers such as liquid crystal display layers having a liquid crystal layer interposed between a color filter layer and a thin-film transistor layer or organic light-emitting diode layers having organic light-emitting diodes formed from thin-film transistor circuitry. The display layers may be configured to form an array of pixels that display images and may include a polarizer. An angle-of-view adjustment layer may overlap the display layers. The angle-of-view adjustment layer may include one or more liquid crystal layers. A first polarizer may be interposed between first and second liquid crystal layers and the second liquid crystal layer may be overlapped by a second polarizer. The first and second polarizers may have pass axes that are aligned with a pass axis of the polarizer in the display layers. One or more liquid crystal layers in the angle-of-view adjustment layer may include dichroic dye.

10 Claims, 5 Drawing Sheets

(56) References Cited

U.S. PATENT DOCUMENTS

2017/0141154 A1* 5/2017 Cha .......................... F21V 9/14
2018/0267344 A1* 9/2018 Wu ...................... G02B 6/0038

* cited by examiner

DISPLAYS WITH ADJUSTABLE PRIVACY LEVELS

This application claims the benefit of provisional patent application No. 62/447,267, filed Jan. 17, 2017, which is hereby incorporated by reference herein in its entirety.

FIELD

This relates generally to electronic devices and, more particularly, to electronic devices with displays.

BACKGROUND

Electronic devices often include displays. For example, laptop computers have displays. Displays are typically designed to display images over a relatively wide angle of view to accommodate movements in the position of a viewer relative to the display. In some situations, such as when a user of a laptop or other device with a display is using the device in public, the wide viewing angle is undesirable as it compromises privacy.

SUMMARY

A display may have display layers such as liquid crystal display layers having a liquid crystal layer interposed between a color filter layer and a thin-film transistor layer, organic light-emitting diode layers having organic light-emitting diodes formed from thin-film transistor circuitry, or structures formed from an array of crystalline semiconductor light-emitting diode dies. The display layers may be configured to form an array of pixels that display images and may include a polarizer.

An angle-of-view adjustment layer may overlap the display layers. The angle-of-view adjustment layer may include one or more liquid crystal layers. A first polarizer may be interposed between first and second liquid crystal layers. The second liquid crystal layer may be interposed between the first polarizer and a second polarizer. The first and second polarizers may have pass axes that are aligned with a pass axis of the polarizer in the display layers. One or more liquid crystal layers in the angle-of-view adjustment layer may include dichroic dye.

An electronic device may include a display with display layers overlapped by an angle-of-view adjustment layer. Control circuitry in the electronic device may be used to supply electric fields to the liquid crystal layers in the angle-of-view adjustment layer. The control circuitry may place the angle-of-view adjustment layer in a wide angle transparency mode that allows images on the pixel array to be viewed over a wide angle of view and may place the angle-of-view adjustment layer in one or more narrower angle transparency modes (privacy modes) in which the angle of view for images on the pixel array is reduced to enhance privacy.

DETAILED DESCRIPTION

Figure 1:
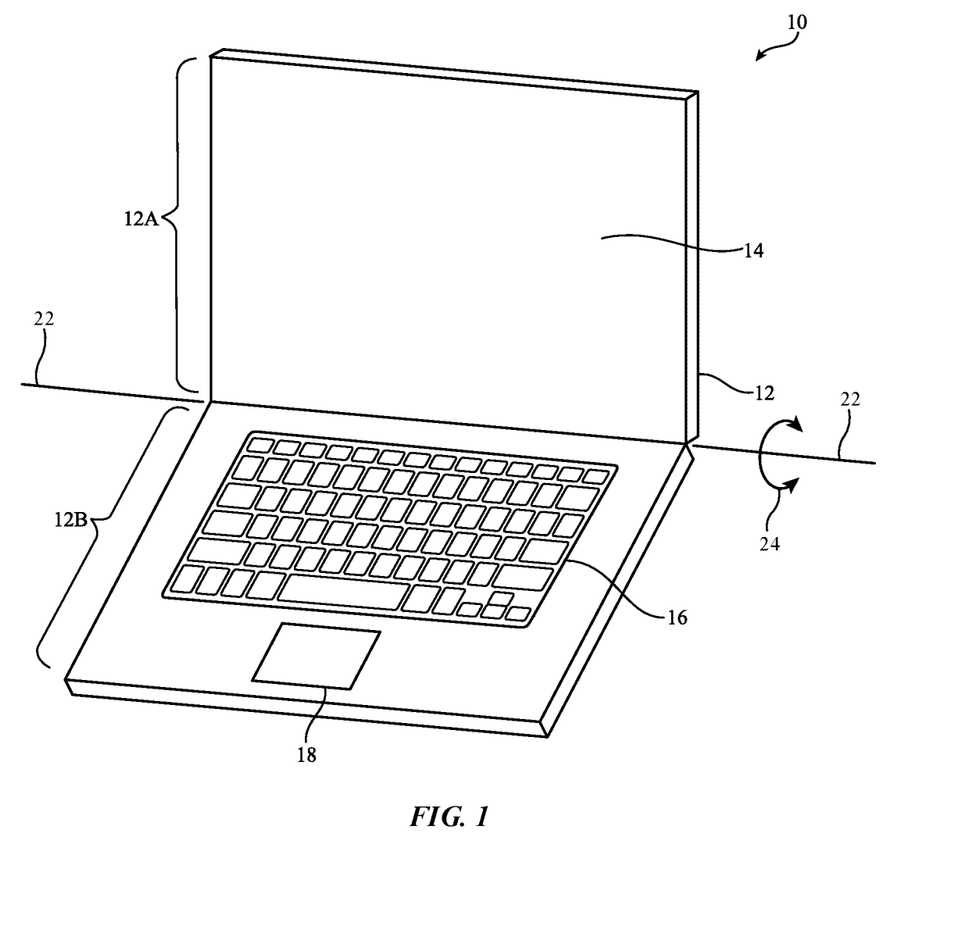
FIG. 1 is a perspective view of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, or other wearable or miniature device, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a laptop computer. Other configurations may be used for device 10 if desired. The example of FIG. 1 is merely illustrative.

As shown in FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing portions 12A and 12B of housing 12 may be connected to each other using hinge structures located along the upper edge of lower housing 12B and the lower edge of upper housing 12A. Hinges may allow upper housing 12A to rotate about axis 22 in directions 24 relative to lower housing 12B.

Display 14 may be mounted in upper housing 12A. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive).

Display 14 may include an array of pixels formed from liquid crystal display (LCD) components, an array of electrophoretic pixels, an array of electrowetting pixels, an array of organic light-emitting diode pixels, or pixels based on other display technologies.

As shown in FIG. 1, device 10 may have input-output devices such as track pad 18 and keyboard 16. Device 10 may also have components such as cameras, microphones, speakers, buttons, status indicator lights, buzzers, sensors, and other input-output devices. These devices may be used to gather input for device 10 and may be used to supply a user of device 10 with output. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Figure 2:
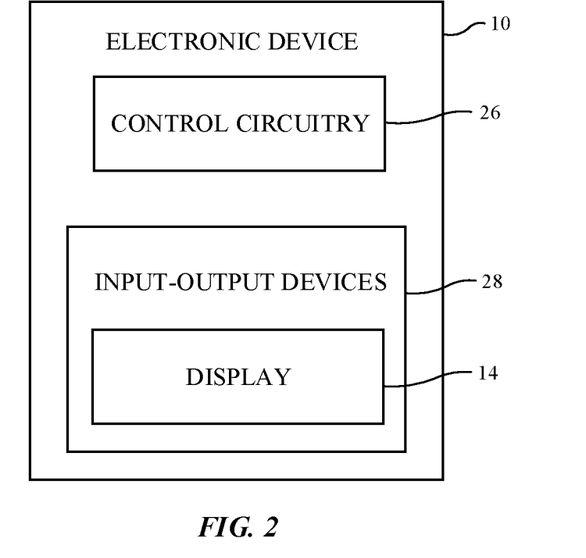
FIG. 2 is a schematic diagram of an illustrative electronic device having a display in accordance with an embodiment.

FIG. 2 is a schematic diagram of device 10. As shown in FIG. 2, electronic device 10 may have control circuitry 26. Control circuitry 26 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 26 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 28 may be used to allow data to be supplied to device 10 and to allow data to be provided from device 10 to external devices. Input-output devices 28 may include buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, etc.), light-emitting diodes and other status indicators, data ports, etc. A user can control the operation of device 10 by supplying commands through input-output devices 28 and may receive status information and other output from device 10 using the output resources of input-output devices 28. Input-output devices 28 may include one or more displays such as display 14.

Control circuitry 26 may be used to run software on device 10 such as operating system code and applications. During operation of device 10, the software running on control circuitry 26 may display images on display 14 using an array of pixels in display 14. Display 14 may include adjustable viewing angle control structures such as an adjustable angle-of-view adjustment layer that overlaps the pixels and/or an adjustable backlight. The angle-of-view adjustment layer can be operated in a wide viewing angle mode when privacy is not needed and can be operated in one or more narrow viewing angle modes when privacy is desired.

When operated in the restricted angle-of-view mode (sometimes referred to as privacy mode), the angle of view of display 14 is restricted. When the angle of view of display 14 is restricted, it is difficult or impossible for viewers that are located at off-axis positions relative to display 14 to view images on display 14 (e.g., a viewer seated next to the user on an airplane will not be able to view images on display 14). At the same time, the user of device 10 who is located in an on-axis position will be able to use display 14 to view images. When operated in an unrestricted angle-of-view mode (sometimes referred to as wide viewing angle mode or normal operation), both on-axis and off-axis viewers will be able to view content on display 14 (i.e., content will not generally be private).

Changes in the operating mode of display 14 to implement angle-of-view restrictions (i.e., adjustments to display 14 to place display 14 in normal viewing mode or a reduced-angle-of-view privacy mode) may be made based on user input to input-output devices 28 or may be made automatically by control circuitry 26. Control circuitry 26 may, for example, use information such as content sensitivity information to determine whether or not content that is being display on display 14 should be displayed in normal mode or privacy mode. If, for example, a user is viewing a movie, the movie may be displayed in normal mode. In the event that a private message such as an incoming text message is detected, display 14 may be placed in privacy mode, thereby ensuring that the content of the text message will not be inadvertently revealed to unauthorized parties. If desired, the angle-of-view adjustment layer for display 14 may be segmented (e.g., using individually adjustable segmented electrodes), so that only a part of display 14 may be placed in privacy mode (e.g., to ensure the privacy of a text message) while the remainder of display 14 is operated normally (e.g. to display a movie).

Figure 3:
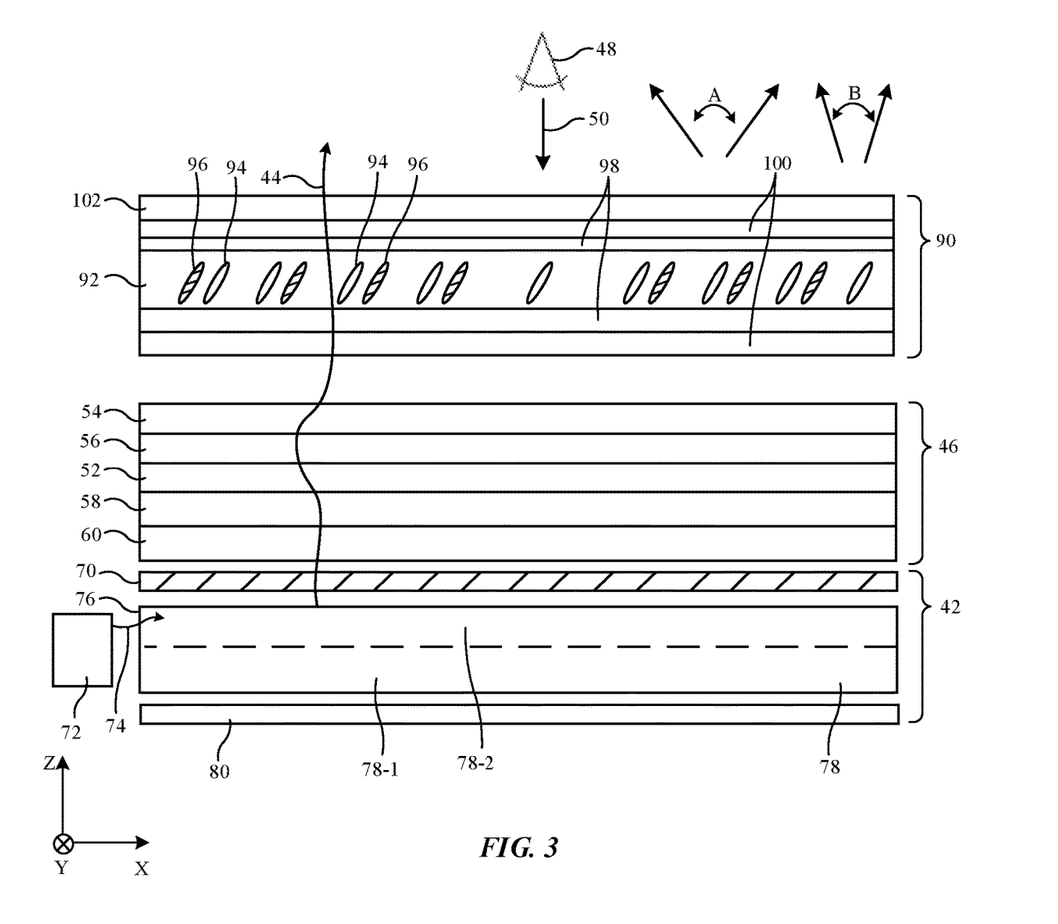
FIG. 3 is a cross-sectional side view of an illustrative display in accordance with an embodiment.

A cross-sectional side view of display 14 is shown in FIG. 3. Display 14 may have a rectangular shape (i.e., display 14 may have a rectangular footprint and a rectangular peripheral edge that runs around the rectangular footprint) or may have other suitable shapes. Display 14 may be planar, as shown in FIG. 3, or may have a curved profile. An adjustable angle-of-view control layer such as angle-of-view adjustment layer 90 may overlap the footprint of display 14. Angle-of-view adjustment layer 90 may have one or more electrically adjustable structures that control circuitry 26 can control dynamically to place display 14 in a normal viewing mode or a private viewing mode. Layer 90 may, for example, have one or more liquid crystal layers that can be adjusted to produce a variable amount of viewing angle restriction (adjustable privacy) based on user input, input from sensors, information on the nature of which content is being presented on display 14, etc.

As shown in FIG. 3, display 14 may include backlight structures such as backlight unit 42 for producing backlight illumination such as backlight illumination (backlight) 44. During operation, backlight illumination 44 travels outwards (vertically upwards in dimension Z in the orientation of FIG. 3) and passes through an array of pixels in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used. Layers 46 may form any suitable type of liquid crystal display (e.g., a fringe-field switching display, a vertical alignment liquid crystal display, a twisted nematic liquid crystal display, an in-plane switching liquid crystal display, an electrically controlled birefringence liquid crystal display, etc.).

During operation of display 14 in device 10, control circuitry 26 (e.g., one or more integrated circuits on a printed circuit) may be used to generate information to be displayed on display 14 (e.g., display data). The information to be displayed may be conveyed to one or more display driver integrated circuits. The display driver circuits may supply data and control signals to an array of pixels in display layers 46 (e.g., pixel circuits in layer 58, etc.).

Backlight structures 42 may include a light guide layer such as light guide layer 78 (sometimes referred to as a light guide structure or light guide). Light guide layer 78 may be formed from one or more stacked layers of transparent material such as clear glass or plastic (e.g., molded plastic that forms a light guide plate, a thin flexible plastic film, etc.). During operation of backlight structures 42, light sources such as light source 72 may generate light that creates backlight 44. Light source 72 may be an array of light-emitting diodes that runs along one or more edges of light guide layer 78 such as edge 76 of light guide layer 78 (i.e., into the page along the X axis in the orientation of FIG. 3). Light-source 72 may emit light 74 into edge 76 of light guide layer 78.

Light 74 may be distributed throughout light guide layer 78 due to the principal of total internal reflection. Scattering features (protrusions, recesses, etc.) may be incorporated into light guide layer 78 (e.g., on the upper and/or lower surface of layer 78) to scatter light from layer 78. Light that is scattered upwards in direction Z from light guide layer 78 may serve as backlight 44 for display 14. Light that scatters downwards may be reflected back in the upwards direction by reflector 80. Reflector 80 may be formed from a reflective material such as a layer of plastic covered with a dielectric mirror thin-film coating.

If desired, backlight structures 42 may emit backlight 44 over an adjustable range of angles. For example, backlight structures 42 may include multiple light guide layers (e.g., layer 78 may be a multilayer stack having a first layer such as layer 78-1 and a second layer such as layer 78-2) and each light guide layer may receive light 74 from a respective set of light-emitting didoes or other light producing components in light source 72. Each light guide layer in the stack (e.g., layer 78-1 and 78-2 in a two-layer configuration) may have light scattering features that are configured to scatter light over a different range of angles. As an example, light guide layer 78 may include a first sublayer such as layer 78-1 that scatters light 72 to form highly collimated backlight 44 (backlight illumination with a narrow range of angles relative to the surface normal of layer 78) and may include a second sublayer 78-2 that scatters light 72 over a wider ranges of angles. When it is desired to operate display 14 in a normal operating mode, light source 72 can be directed to emit light into second sublayer 78-2, so that the pixel array of layers 46 is illuminated over a wide range of angles. When it is desired to operate display 14 in a privacy mode, light source 72 can be directed to emit light into first sublayer 78-1, so that the pixel array of layers 46 is illuminated over a narrow range of angles (e.g., so that backlight 44 is collimated, thereby reducing the visibility of images from off-axis angles). Any suitable variable adjustable-backlight-angle backlight structures may be used in forming backlight structures 42 if desired. The use of multiple overlapping light guide layers with different light scattering properties is illustrative. If desired, backlight structures 42 may be configured to only emit collimated light (or light over a relatively narrow range of angles) or may be configured to only emit wide-angle light.

To enhance display performance, optical films 70 may be incorporated between backlight structures 42 and layers 46. Optical films 70 may include diffuser layers for helping to homogenize backlight 44 and thereby reduce hotspots, light collimating films such as prism films (sometimes referred to as brightness enhancement films) and turning films for directing backlight 44 towards direction Z, and compensation films for enhancing off-axis viewing. Optical films 70 may overlap the other structures in backlight unit 42 such as light guide layer 78 and reflector 80. For example, if light guide layer 78 has a rectangular footprint in the X-Y plane of FIG. 3, optical films 70 and reflector 80 may have a matching rectangular footprint. If desired, films such as compensation films may be incorporated into other layers of display 14 (e.g., a polarizer layer).

Angle-of-view adjustment layer 90 may be operated in multiple viewing modes such as a normal angle-of-view mode and one or more reduced angle-of-view modes. When operated in a normal angle-of-view mode, viewer 48 can view images on display 14 over a relatively wide range of angles A. When privacy is desired, display 14 can be operated in the reduced angle-of-view mode. In this mode, viewer 48 can view images on display 14 over a more restricted range of angles (see, e.g., reduced angle-of-view range B, where B<A, B<60% of A, where B<40% of A, etc.).

As shown in FIG. 3, layer 90 may include one or more liquid crystal layers such as liquid crystal layer 92. Liquid crystal layer 92 may include liquid crystal molecules 94 and may optionally include light-absorbing dichroic dye molecules 96. In configurations in which layer 92 includes only liquid crystal molecules 94, layer 92 may be configured to serve as an electrically controllable birefringence layer (sometimes referred to as an ECB liquid crystal layer). In configurations in which layer 92 includes dichroic dye 96, liquid crystal molecules 94 may serve as host molecules and dichroic dye molecules 96 may serve as guest molecules (e.g., layer 92 may form a dichroic dye guest-host liquid crystal layer). Guest dye molecules 96 may exhibit maximum light absorption when the electric field of a light ray is oriented with a first orientation relative to molecules 96 (e.g., parallel to the longitudinal axis of molecules 96) and may exhibit minimum light absorption when the electric field of a light ray is oriented with a second orientation relative to molecules 96 (e.g., perpendicular to the longitudinal axis of molecules 96). The orientation of dye molecules 96 is aligned with the orientation of elongated liquid crystal molecules 94, so molecules 96 can be rotated by rotating liquid crystal molecules 94.

Layer 90 may have two or more liquid crystal layers such as layer 92. In the illustrative configuration of FIG. 3, layer 90 contains a single liquid crystal layer. Liquid crystal layer 92 may be interposed between transparent electrodes 98. Control circuitry 26 may control the operation of layer 90 by applying controlled amounts of electric field to layer 92 using electrodes 98. Electrodes 98 may be formed from transparent conductive material such as indium tin oxide and may be supported by transparent planar members such as clear substrates 100 (e.g., glass, plastic, etc.). Polarizer layers and/or other layers in display 14 may also serve as substrates for electrodes 98. The use of substrates 100 to support electrodes 98 in FIG. 3 is merely illustrative.

Layer 90 may include a polarizer such as polarizer 102. Liquid crystal alignment layers (e.g., polyimide alignment layers or other suitable alignment layers) may be formed on the surfaces of electrodes 98 facing layer 92. These layers provide liquid crystals 94 with a default alignment in the absence of an applied electric field. When an electric field is applied to liquid crystals 94, the orientation of liquid crystal molecules 94 (and dye molecules 96, if present) will change in proportion to the strength of the applied field. The polarization of backlight illumination 44 is affected by the orientations of liquid crystal molecules 96. By changing in the orientation of liquid crystal molecules 94 with an adjustable electric field, the polarization state of rays of backlight illumination 44 that are passing through layer 92 can be adjusted.

In configurations in which no dye molecules 96 are included in layer 92, off-axis light absorption can be selectively enhanced during privacy mode by adjusting the orientations of liquid crystal molecules 94 to alter the birefringence in layer 92. The changes in birefringence affect the polarization state of light 44 passing through layer 92 and therefore the amount of light 44 that is transmitted through polarizer 102.

In configurations for layer 90 in which dye molecules 96 are included in layer 92, changes in orientation for dye molecules 96 affect light absorption in layer 92. As an example, a positive dichroic dye will exhibit maximum light absorption and minimum light transmission when the dye molecules are oriented parallel to the electric field of light 44 and will exhibit minimum light absorption and maximum light transmission when the dye molecules are oriented perpendicular to the electric field of light 44. This effect can be exploited in addition to electrically controlled birefringence effects to selectively enhance off-axis light absorption in privacy mode.

With one illustrative configuration, polarizer 60 may have a pass axis aligned with the X axis of FIG. 3. Polarizer 54 may have a pass axis aligned with the Y axis of FIG. 3. Polarizer 102 may have a pass axis that is aligned with the Y axis and that is therefore aligned with the pass axis of polarizer 54. The alignment layers on surface of electrodes 98 may be configured to align liquid crystal molecules 94 with the Y axis (parallel to the pass axis of polarizer 54) in the absence of an applied electric field. With this configuration, backlight illumination 44 will become linearly polarized along the Y axis when passing through polarizer 54. In the absence of applied electric fields to layer 92, liquid crystal molecules 94 will not rotate, off-axis light 44 will remain predominantly linearly polarized, and off-axis light transmission will be relatively high. In the presence of applied electric fields to layer 92, liquid crystal molecules 94 will rotate upwardly and birefringence will be induced in layer 92 accordingly. This will cause off-axis light 44 to become elliptically polarized at polarizer 102 and will reduce off-axis light transmission through polarizer 102 (and therefore layer 90). In configurations in which dye 96 is present, off-axis light absorption will be enhanced when liquid crystal molecules 94 are rotated by applying electric fields to layer 92 to rotate molecules 94 and 96.

Figure 4:
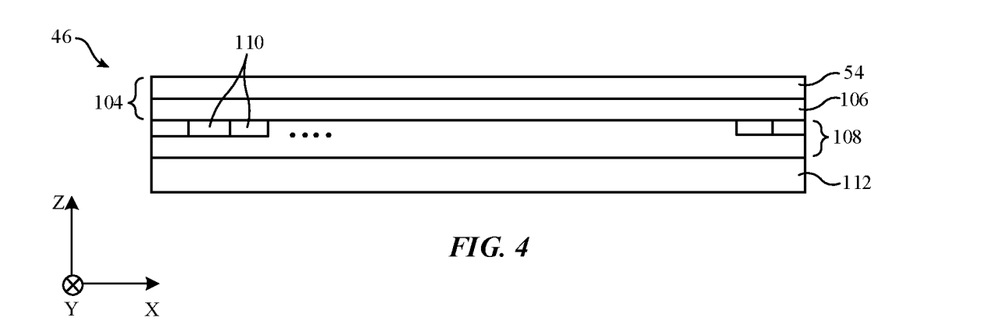
FIG. 4 is a cross-sectional side view of an illustrative light-emitting diode pixel array of the type that may be used in the display of FIG. 3 in accordance with an embodiment.

In the example of FIG. 3, display layers 46 are liquid crystal display layers and include a liquid crystal layer such as layer 52 (e.g., a layer of liquid crystal molecules sandwiched between a pair of conductive transparent electrodes and polyimide alignment layers). If desired, display layers 46 may be formed from other types of display structures. As an example, display layers 46 may be based on light-emitting diode display structures. As shown in FIG. 4, for example, display layers 46 may include a substrate such as substrate 112 (e.g., glass, plastic, one or more inorganic buffer layers, etc.). Thin-film circuitry 108 may be formed on substrate 112. Thin-film circuitry 108 may include thin-film transistors, thin-film capacitors, and organic light-emitting diodes that form pixels 110. Each pixel 110 may, for example, include a pixel circuit that controls the light output from a respective organic light-emitting diode. Pixels 110 may be arranged in an array for displaying images for viewer 48 of FIG. 3 in a configuration for display 14 of FIG. 3 in which display layers 46 of FIG. 4 have been used in place of display layers 46 of FIG. 3. If desired, pixels 110 in display layers 46 of FIG. 3 or other display layers for display 14 may be formed from micro-LEDs (e.g., an array of discrete light-emitting diodes each of which is formed from a crystalline semiconductor die). In general, display layers 46 may be formed from any suitable type of display (e.g., an electrophoretic display, a plasma display, a display formed from microelectromechanical systems pixels, etc.).

The pixel array of display layers (layer) 46 of FIG. 4 may be overlapped by layer 104. Layer 104 may include linear polarizer 54 (e.g., a polarizer with a pass axis aligned with the Y axis of FIGS. 3 and 4). Layer 104 may, if desired, include a wave plate such as circular wave plate 106 (e.g., wave plate 106 may be included so that layer 104 forms a circular polarizer that helps suppress ambient light reflections from reflective structures in thin-film circuitry 108).

Figure 5:
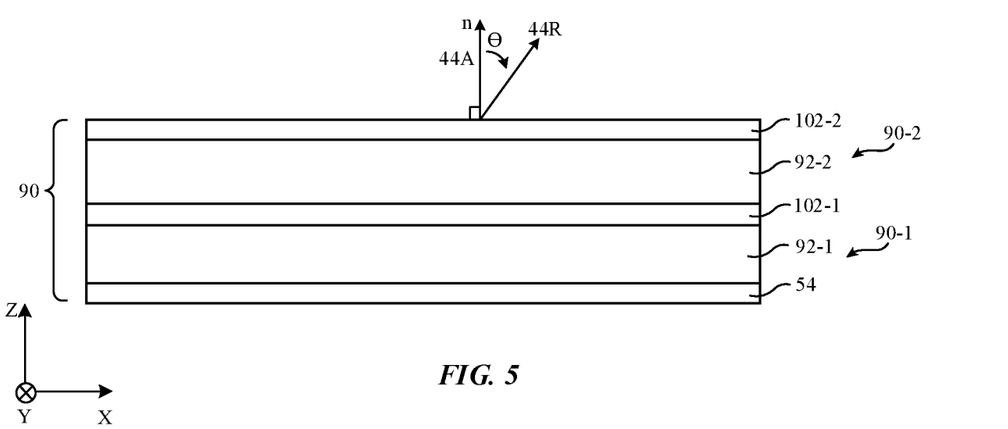
FIG. 5 is a cross-sectional side view of an illustrative an angle-of-view adjustment layer formed from a pair of stacked liquid crystal cells in accordance with an embodiment.

As shown in FIG. 5, angle-of-view adjustment layer 90 may include sublayers such as first layer 90-1 and second layer 90-2. Layer 90-1 may be formed from first liquid crystal layer 92-1, which is interposed between polarizer 54 and polarizer 102-1. Layer 90-2 may be formed from second liquid crystal layer 92-2, which is interposed between polarizer 102-1 and polarizer 102-2. Polarizers 54, 92-1, and 92-2 may have pass axes aligned with the Y axis of FIG. 5 (as an example). The use of multiple stacked liquid crystal cells in layer 90 may enhance privacy. In particular, light transmission through layer 90 may be reduced more for light at off-axis angles θ (e.g., light rays such as off-axis light ray 44R at non-zero angles θ with respect to surface normal n of layer 90 and display 14) than for on-axis light (e.g., light rays such as on-axis light ray 44A, which is oriented at an angle θ=0° with respect to surface normal n and is therefore parallel to surface normal n).

Figure 6:
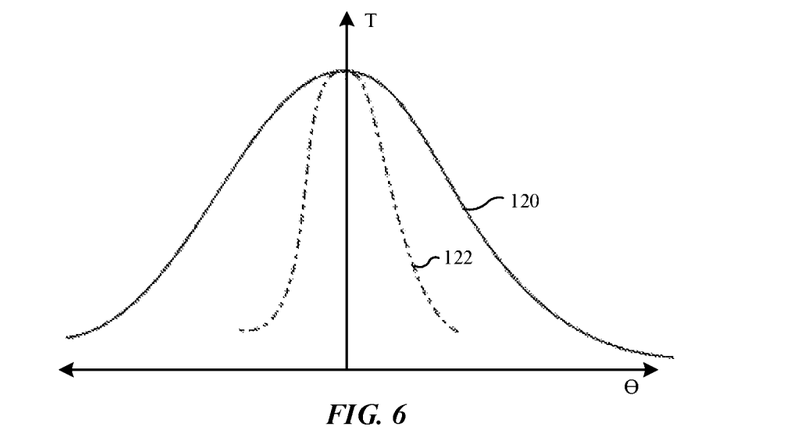
FIG. 6 is a graph showing how the angular spread of light transmission through an angle-of-view adjustment layer may be narrowed when multiple liquid crystal cells are stacked in the angle-of-view adjustment layer in accordance with an embodiment.

As shown in FIG. 6, transmission T of light 44 passing through a single angle-of-view adjustment layer such as layer 90-1 (see, e.g., layer 90 of FIG. 3) when layer 90-1 is in its privacy mode of operation may be characterized by a curve such as light transmission curve 120 of FIG. 6, whereas transmission T of light 44 passing through multiple angle-of-view adjustment layers such as layers 90-1 and 90-2 in their privacy mode of operation may be characterized by a narrower (more collimated) curve such as light transmission curve 122 of FIG. 6. Liquid crystal layers 92-1 and 92-2 of layer 90 of FIG. 5 may both be liquid crystal layers without guest dye molecules 96, may both be liquid crystal layers that contain liquid crystal molecules 94 and dye molecules 96, or may include a single liquid crystal layer without dye and a single liquid crystal layer with dye. Configurations with three or more stacked angle-of-view adjustment layers (with or without dye 96) may also be used, if desired.

Any suitable dichroic dye 96 may be used in the liquid crystal material of layer 90 (e.g., black dye, blue dye, purple dye, etc.). The concentration of dye may be at least 0.1%, at least 0.5%, 0.1% to 3%, less than 5%, or other suitable concentration. There may be one liquid crystal layer in layer 90 or layer 90 may contain a stack of two or more liquid crystal layers separated by interposed polarizers. The transmission axis of each polarizer may be parallel to the transmission axis of the top polarizer in display layers 46 (e.g., polarizer 54) or may have other suitable orientation(s). The liquid crystal alignment directions of liquid crystal layer(s) 92 of layer 90 may be parallel or perpendicular to the liquid crystal alignment direction of liquid crystal layer 52. Positive or negative liquid crystal material may be used for the liquid crystal layers of display 14. For effective privacy mode switching, it may be desirable for the electrically induced retardation $\Delta n d$ of layer 90 to be at least 500 nm, 600-900 nm, or less than 900 nm, where $\Delta n$ is the birefringence induced in the electrically adjustable liquid crystal layer of layer 90 and d is the liquid crystal layer thickness).

The foregoing is merely illustrative and various modifications can be made to the described embodiments. The foregoing embodiments may be implemented individually or in any combination.

What is claimed is:

1. An apparatus, comprising:
a pixel array configured to display an image; and
an angle-of-view adjustment layer overlapping the pixel array that contains a liquid crystal layer with liquid crystal molecules and dichroic dye molecules; and
a backlight that provides backlight illumination to the pixel array, wherein the pixel array is interposed between the backlight and the angle-of-view adjustment layer and wherein the backlight comprises:
a first light guide layer;
a second light guide layer that overlaps the first light guide layer; and
a light source that is electrically adjustable between a first operating mode in which the backlight illumination is provided to an edge of the first light guide layer and a second operating mode in which the backlight illumination is provided to an edge of the second light guide layer.

2. The apparatus defined in claim 1 wherein the pixel array has liquid crystal molecules and is free of dichroic dye molecules and has a polarizer interposed between the liquid crystal molecules and the angle-of-view adjustment layer.

3. The apparatus defined in claim 1 wherein the angle-of-view adjustment layer comprises at least one additional liquid crystal layer and a polarizer interposed between the liquid crystal layer and the additional liquid crystal layer.

4. The apparatus defined in claim 3 wherein the additional liquid crystal layer includes additional dichroic dye molecules.

5. The apparatus defined in claim 1 wherein the angle-of-view adjustment layer comprises:
a first liquid crystal layer interposed between first and second electrodes; and
a second liquid crystal layer interposed between third and fourth electrodes.

6. The apparatus defined in claim 5 wherein the pixel array has first and second polarizers, the apparatus further comprising:
a third polarizer interposed between the first and second liquid crystal layers; and
a fourth polarizer, wherein the second liquid crystal layer is interposed between the third polarizer and the fourth polarizer.

7. The apparatus defined in claim 1 further comprising:
control circuitry configured to control the angle-of-view adjustment layer to place the display in a selected one of: 1) a normal operating mode and 2) a privacy mode.

8. The apparatus defined in claim 7 wherein the angle-of-view adjustment layer comprises at least one additional liquid crystal layer and a polarizer interposed between the liquid crystal layer and the additional liquid crystal layer.

9. The apparatus defined in claim 7 wherein the angle-of-view adjustment layer includes first and second additional liquid crystal layers and first and second pairs of electrodes with which the control circuitry controls the angle-of-view adjustment layer wherein the first additional liquid crystal layer is interposed between the first pair of electrodes, and wherein the second additional liquid crystal layer is interposed between the second pair of electrodes.

10. The apparatus defined in claim 1, wherein the first light guide layer has first light scattering features configured to scatter the backlight illumination over a first angular spread and wherein the second light guide layer has second light scattering features configured to scatter the backlight illumination over a second angular spread that is different than the first angular spread.

* * * * *